(12) United States Patent
You (10) Patent No.: US 9,347,601 B2
(45) Date of Patent: May 24, 2016

(54) SUPPORTING DEVICE

(71) Applicant: Wistron Corp., New Taipei (TW)

(72) Inventor: Gang You, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/297,550

(22) Filed: Jun. 5, 2014

(65) Prior Publication Data

US 2015/0216063 A1 Jul. 30, 2015

(30) Foreign Application Priority Data

Jan. 29, 2014 (CN) .......................... 2014 2 0057266

(51) Int. Cl.
| | |
|---|---|
| *A47B 97/04* | (2006.01) |
| *F16M 11/04* | (2006.01) |
| *F16M 11/38* | (2006.01) |
| *F16M 11/10* | (2006.01) |
| *F16M 13/00* | (2006.01) |

(52) U.S. Cl.
CPC ............. *F16M 11/04* (2013.01); *F16M 11/041* (2013.01); *F16M 11/10* (2013.01); *F16M 11/38* (2013.01); *F16M 13/00* (2013.01)

(58) Field of Classification Search
CPC ..... H05K 5/0204; F16M 11/38; F16M 11/04; F16M 11/041; F16M 11/10
USPC ................. 248/451, 452, 453, 473, 488, 918, 248/278.1, 462, 463, 464, 465
See application file for complete search history.

(56) References Cited

U.S. PATENT DOCUMENTS

| | | | | |
|---|---|---|---|---|
| 3,980,266 A | * | 9/1976 | Jones | A47B 23/043 248/454 |
| 4,522,364 A | * | 6/1985 | Charney | A47B 19/08 248/460 |
| 8,083,196 B2 | * | 12/2011 | Chang | A61B 19/26 248/276.1 |
| 9,062,819 B1 | * | 6/2015 | Chen | F16M 13/04 |
| 2012/0024918 A1 | * | 2/2012 | DeCamp et al. | 224/267 |
| 2013/0161967 A1 | * | 6/2013 | Jarrett et al. | 294/142 |
| 2013/0243231 A1 | * | 9/2013 | Parraga Gimeno | 381/332 |
| 2013/0249227 A1 | * | 9/2013 | Lin | 294/142 |
| 2013/0270850 A1 | * | 10/2013 | Fan | 294/137 |

\* cited by examiner

*Primary Examiner* — Gwendolyn W Baxter (57) ABSTRACT

A supporting device is provided, including a longitudinal main body, a connecting member, and a longitudinal supporting member. The connecting member is pivotally connected to the main body, such that the main body is rotatable relative to the connecting member along a first axis. The main body is extended along the first axis. The supporting member is pivotally connected to the connecting member, such that the supporting member is rotatable relative to the connecting member along a second axis. The first axis is substantially perpendicular to the second axis.

18 Claims, 14 Drawing Sheets

SUPPORTING DEVICE

CROSS REFERENCE TO RELATED APPLICATIONS

The present application is based on, and claims priority from, China Patent Application No. 201420057266.5, filed on Jan. 29, 2014, the disclosure of which is hereby incorporated by reference herein in its entirety.

BACKGROUND OF THE INVENTION

1. Field of the Invention

The application relates in general to a supporting device, and in particular, to a supporting device adapted to an electronic device.

2. Description of the Related Art

In recent years, many electronic devices with touch panels have been provided, such as tablet computers and smartphones. Tablet computers and smartphones can be supported by a foldable cover or by directly being held by a user during operation. However, conventional supporting mechanisms are usually not stable, and cannot be applied to other electronic devices of different dimensions.

BRIEF SUMMARY OF INVENTION

To address the aforementioned deficiency of conventional electronic devices, an embodiment of the invention provides a supporting device, including a longitudinal main body, a connecting member, and a longitudinal supporting member. The connecting member is pivotally connected to the main body, such that the main body is rotatable relative to the connecting member along a first axis. The main body is extended along the first axis. The supporting member is pivotally connected to the connecting member, such that the supporting member is rotatable relative to the connecting member along a second axis. The first axis is substantially perpendicular to the second axis.

In some embodiments, the main body comprises a cylindrical structure and the connecting member comprises a sector-shaped structure. A sector-shaped first recess is formed on the main body. The connecting member is accommodated in the first recess and protrudes from the main body. A side surface of the main body is aligned with a surface of the connecting member. The connecting member forms an angle of 15°-45°, and the first recess forms an angle of 80°-120°.

In some embodiments, the connecting member comprises a protrusion and the main body has a groove. The protrusion is movably joined to the groove.

In some embodiments, the supporting member forms a concave surface.

In some embodiments, the supporting member further comprises a clamping member, an auxiliary bar, and an auxiliary arm. The main body further has a second recess and a third recess, wherein the second and third recesses are respectively formed on the opposite sides of the main body. The clamping member is disposed in the third recess and connected to the main body. The auxiliary bar is disposed in the second recess and connected to the main body. One end of the auxiliary arm is pivotally connected to the supporting member, and the other end of the auxiliary arm is movably connected to the auxiliary bar. When the supporting device is in the folded state, the extending direction of the supporting member is parallel to that of the main body, and the auxiliary arm is accommodated in the second recess.

In some embodiments, the auxiliary arm comprises a rod and a slider, wherein the slider is movably connected to the auxiliary bar. The opposite ends of the rod are respectively and pivotally connected to the slider and the supporting member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the supporting device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
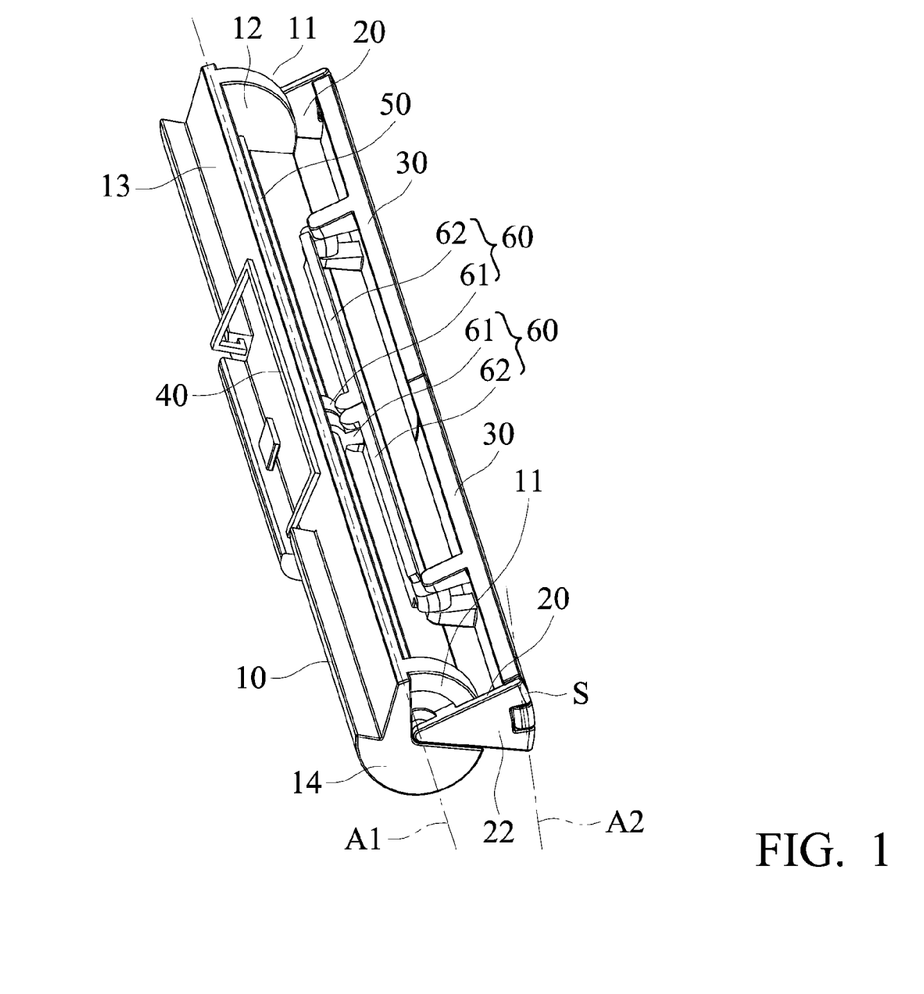
FIG. 1 is a schematic diagram of a supporting device according to an embodiment of the invention.
Figure 2:
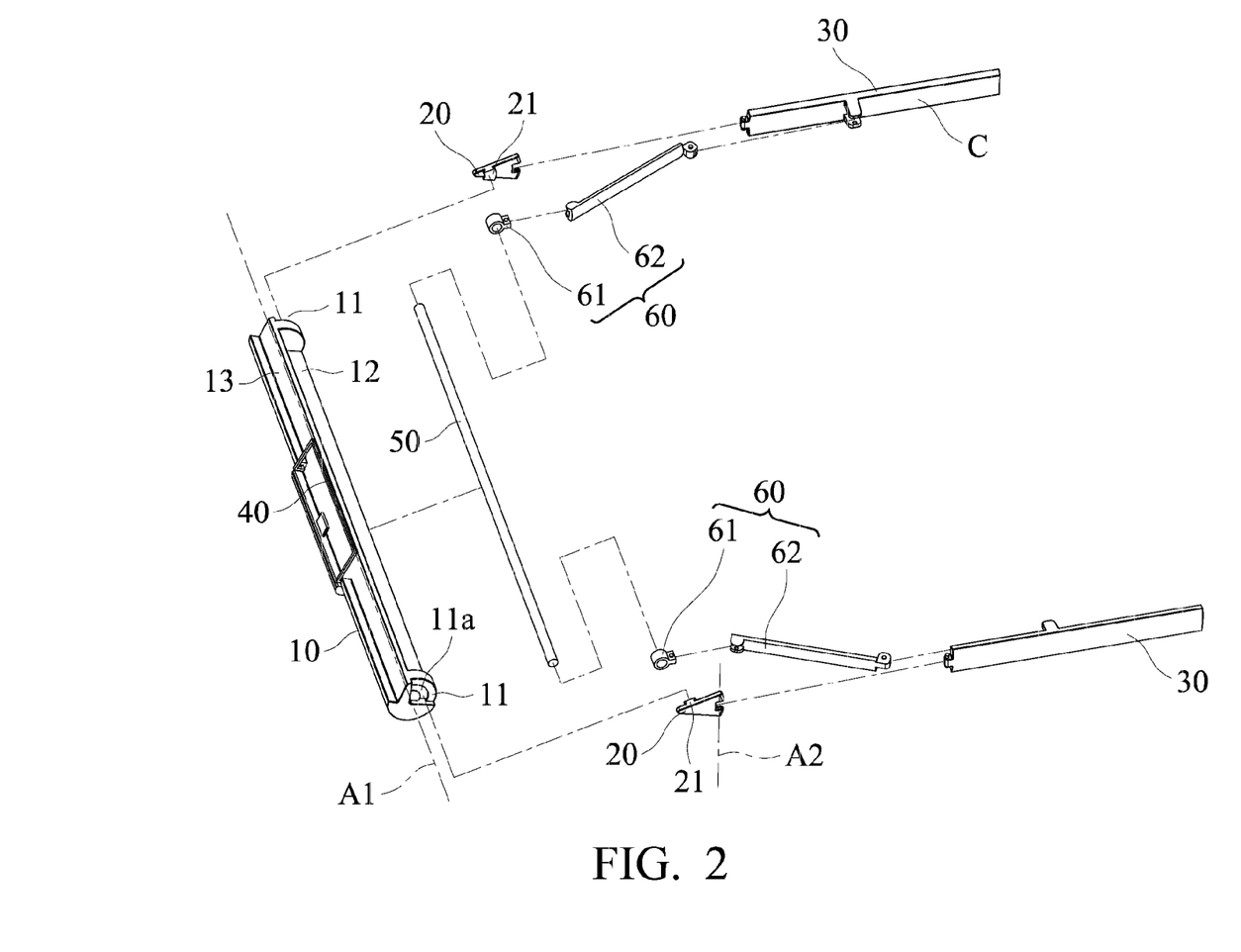
FIG. 2 is an exploded diagram of the supporting device in FIG. 1.

FIG. 1 is a schematic diagram of a supporting device according to an embodiment of the invention, and FIG. 2 is an exploded diagram of the supporting device in FIG. 1. The supporting device can be used to support an electronic device, comprising a main body 10, two connecting members 20, two supporting members 30, a clamping member 40, an auxiliary bar 50, and two auxiliary arms 60. The main body 10 comprises a substantially cylindrical structure, and the connecting member 20 comprises a sector-shaped structure.

Two first recesses 11 are respectively formed on opposite sides of the cylindrical main body 10. In this embodiment, each of the first recesses 11 forms a sector-shaped space, wherein the angle of the first recess 11 is in the range of 80°-120°, and the angle of the connecting member 20 is in the range of 15°-45°. As shown in FIG. 2, the connecting members 20 respectively form a T-shaped protrusion 21, and the first recesses 11 respectively form a curved groove 11a. The connecting member 20 can be pivotally connected to the main body 10 by engaging the protrusion 21 with the groove 11a in a movable manner. Thus, when the protrusion 21 slides along the groove 11a, the connecting member 20 can rotate relative to the main body 10 along a first axis A1. As a portion of the connecting member 20 is accommodated in the first recess 11, a side surface 14 of the main body 10 is aligned to a surface 22 of the connecting member 20 (FIG. 1), such that an integrated appearance for the supporting device can be achieved. In some embodiments, the protrusion 21 may comprise an L-shaped structure. In another embodiment, the connecting member 20 can be pivotally connected to the main body 10 via a hinge.

Referring to FIGS. 1 and 2, the supporting member 30 is pivotally connected to a curved surface S of the connecting member 20 and rotatable relative to the connecting member 20 along a second axis A2, wherein the second axis A2 is substantially perpendicular to the first axis A1. It should be noted that the supporting member 30 comprises a longitudinal structure and a concave surface C. Therefore, the electronic device E can be stably supported by the supporting device (as shown in FIG. 6B). Furthermore, in this embodiment, a second recess 12 and a third recess 13 are formed on the main body 10, wherein the third recess 13 is opposite to the first and second recesses 11 and 12. The auxiliary bar 50 is disposed in the second recess 12 and connected to the main body 10. The clamping member 40 is adjacent to the third recess 13 and connected to the main body 10.

As shown in FIGS. 1 and 2, the auxiliary arm 60 comprises a slider 61 and a rod 62. The slider 61 is pivotally connected to an end of the rod 62 and movably connected to the auxiliary bar 50, and the other end of the rod 62 is pivotally connected to the supporting member 30. In another embodiment, the auxiliary bar 50 and the main body 10 can be integrally formed in one piece to reduce the number of assembly steps and facilitate the reliability of the supporting device.

Figure 3A:
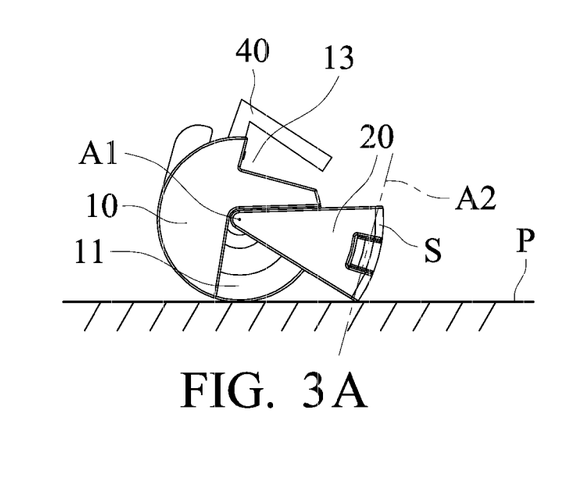
FIG. 3A is a side view of the supporting device in a folded state according to an embodiment of the invention.

FIGS. 3A-6B are the schematic diagrams showing the steps to operate the supporting device. As shown in FIG. 3A, the connecting member 20 protrudes from the main body 10, such that both the main body 10 and the connecting member 20 come into contact with a flat surface P when the supporting device is in a folded state. Thus, the supporting device can be stably placed on the flat surface P, preventing the cylindrical main body 10 of the supporting device from rolling on the flat surface P. Referring to FIG. 3B, when the supporting device is in the folded state, the supporting member 30 is folded toward the main body 10, and the extending direction of the supporting member 30 is parallel to that of the main body 10. The slider 61 can slide along the auxiliary bar 50 to guide the rod 62 to be accommodated in the second recess 12 (as shown in FIG. 1), such that the supporting device can be easily stored.

Figure 3B:
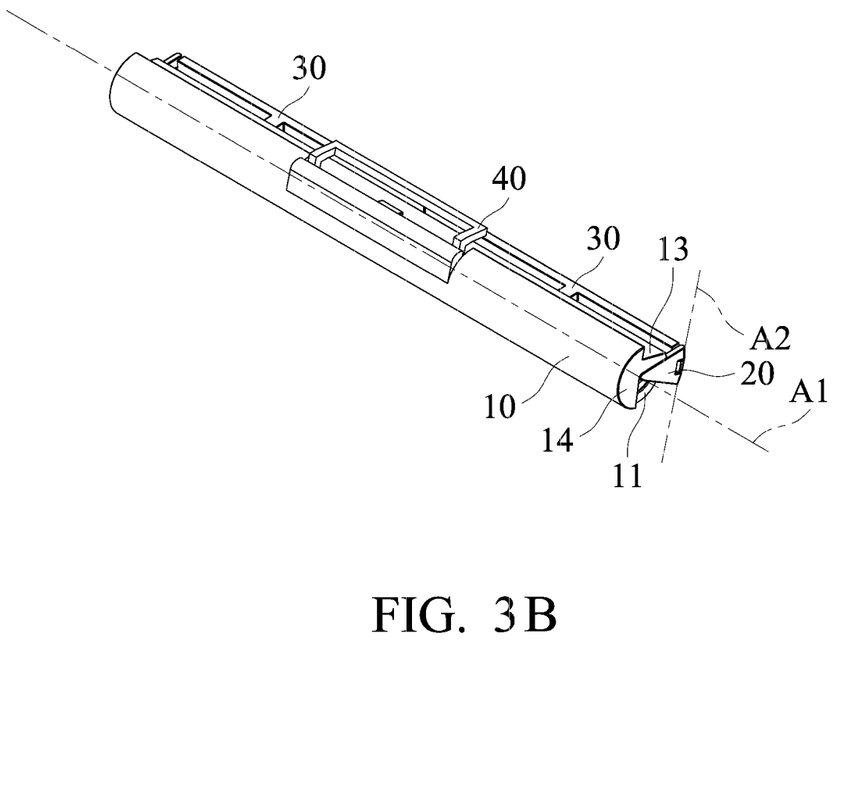
FIG. 3B is a perspective diagram of the supporting device in a folded state according to an embodiment of the invention.
Figure 4A:
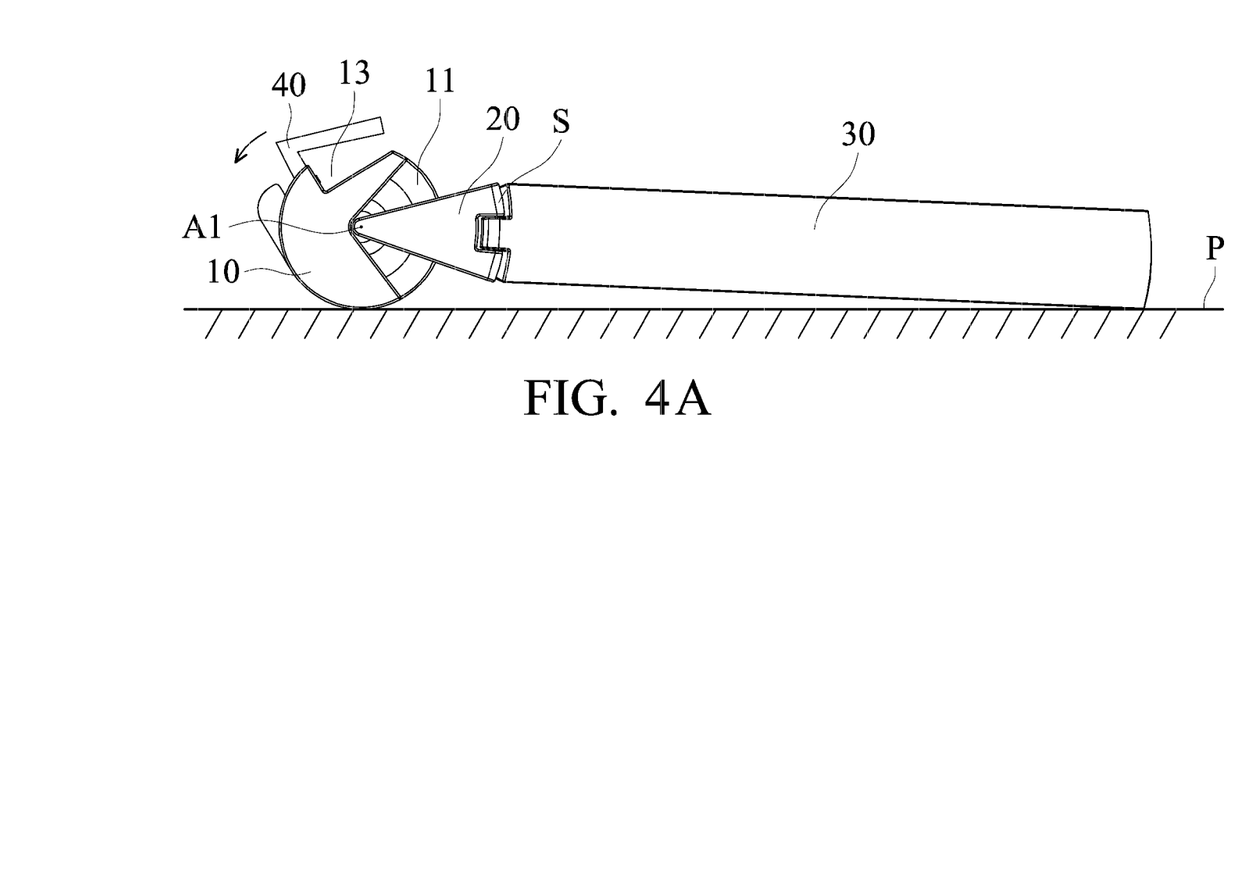
FIG. 4A is a side view illustrating that a supporting member rotates along a second axis relative to a connecting member, and a main body rotates along a first axis relative to the connecting member according to an embodiment of the invention.
Figure 4B:
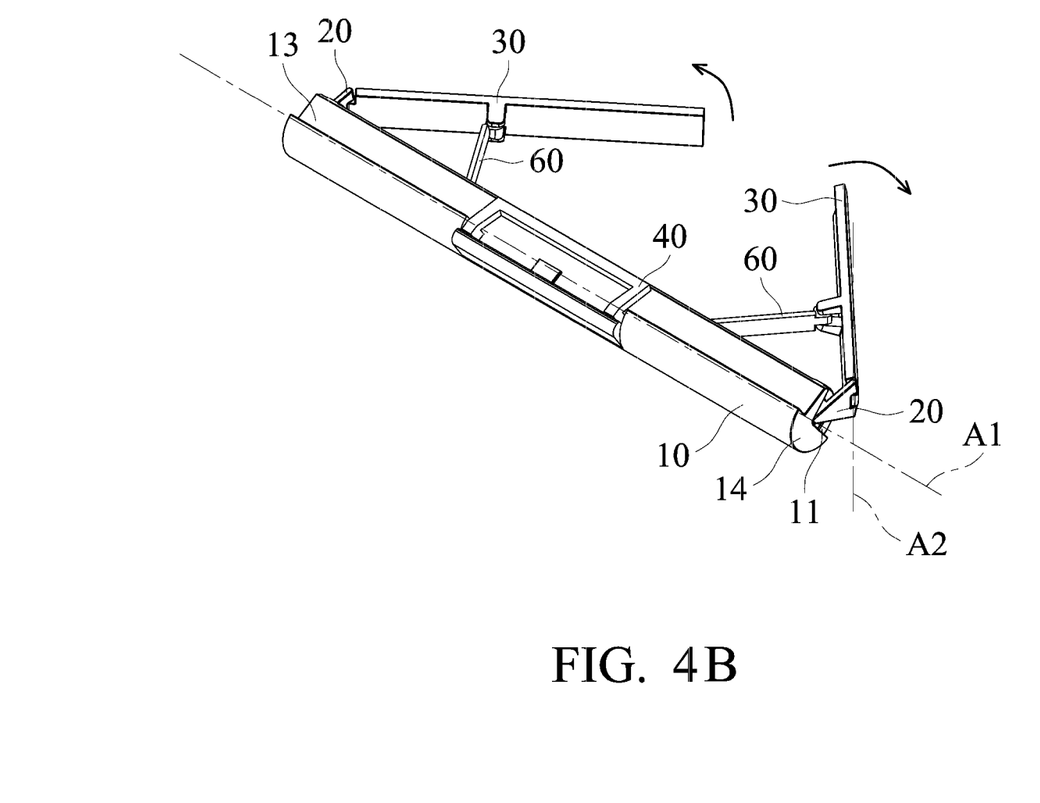
FIG. 4B is a schematic diagram illustrating that a supporting member rotates along a second axis relative to a connecting member, and a main body rotates along a first axis relative to the connecting member according to an embodiment of the invention.

Referring to FIGS. 4A and 4B, to use the supporting device for supporting an electronic device E, the supporting members 30 can be rotated relative to the connecting members 20 along the second axis A2 (FIG. 4B). As shown in FIGS. 3A and 3B, an acute angle is formed between the second axis A2 and the flat surface P. Thus, when the supporting members 30 rotate along the second axis A2 and contact the flat surface P, the connecting members 20 are lifted from the flat surface P, and the main body 10 rolls leftward along the flat surface P. That is, the main body 10 rotates counterclockwise relative to the connecting member 20 with respect to the first axis A1, as indicated by the arrow in FIG. 4A.

Figure 5A:
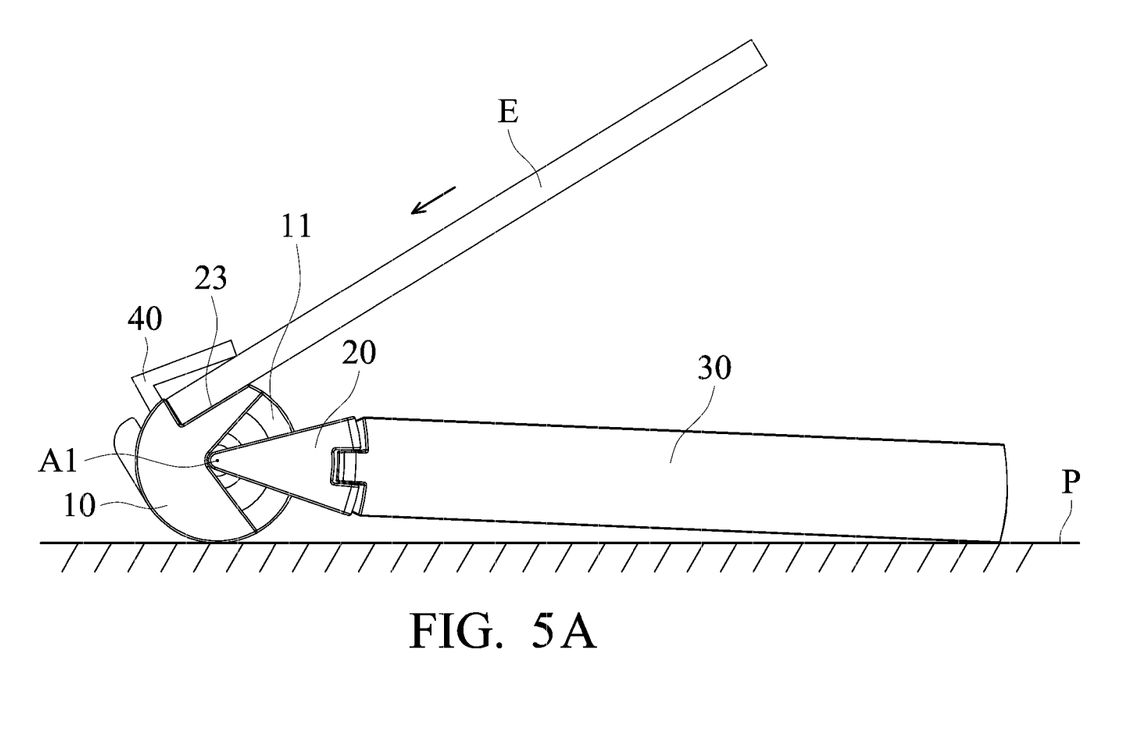
FIG. 5A is a side view representing that an electronic device is inserted into a third recess of a supporting device according to an embodiment of the invention.
Figure 5B:
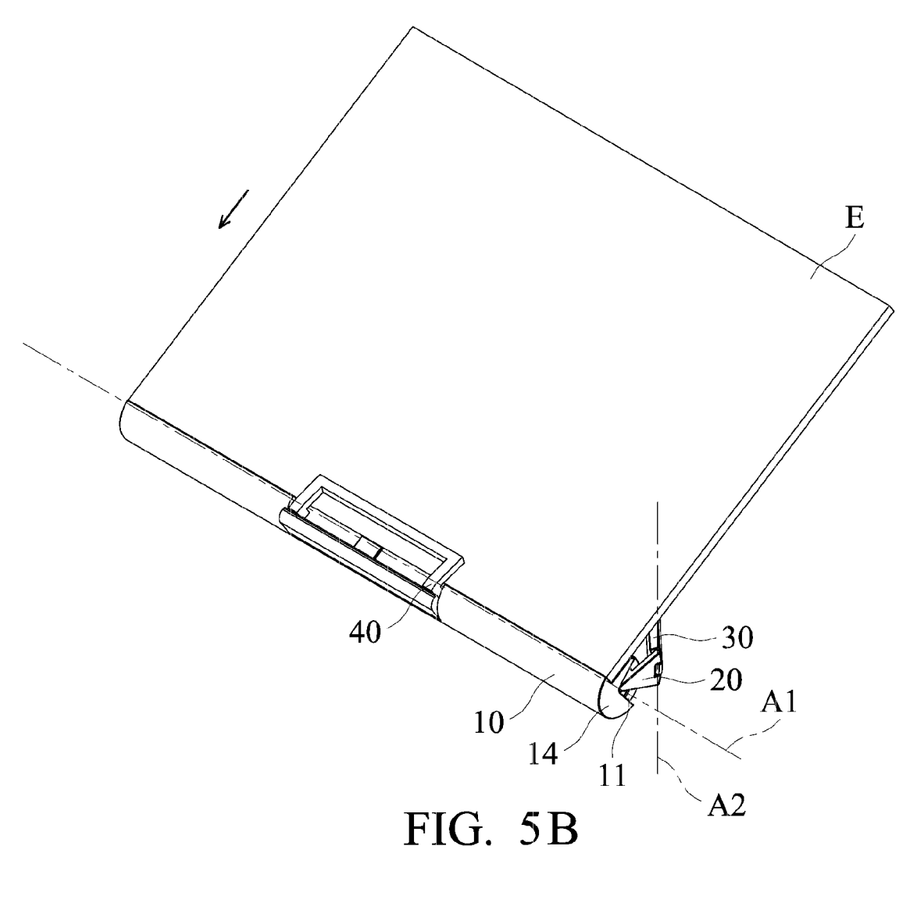
FIG. 5B is a schematic diagram representing an electronic device inserted into a third recess of a supporting device according to an embodiment of the invention.

Referring to FIGS. 5A and 5B, after the main body 10 rotates to a transitional angle relative to the connecting member 20, the user can apply an external force to pull and open the clamping member 40 relative to the main body 10, such that the electronic device E can be inserted into the third recess 23. When the external force is released, the electronic device E can be clamped by the clamping element 40. In this embodiment, the third recess 23 forms an angle of about 90°, such that the electronic device E (a tablet computer, for example) can attach to the inner wall of the third recess 23, and the clamping member 40 can stably restrict the electronic device E in the third recess 23. In some embodiments, the shape of the third recess 23 can also be modified according to the specific profile of the electronic device E.

Figure 6A:
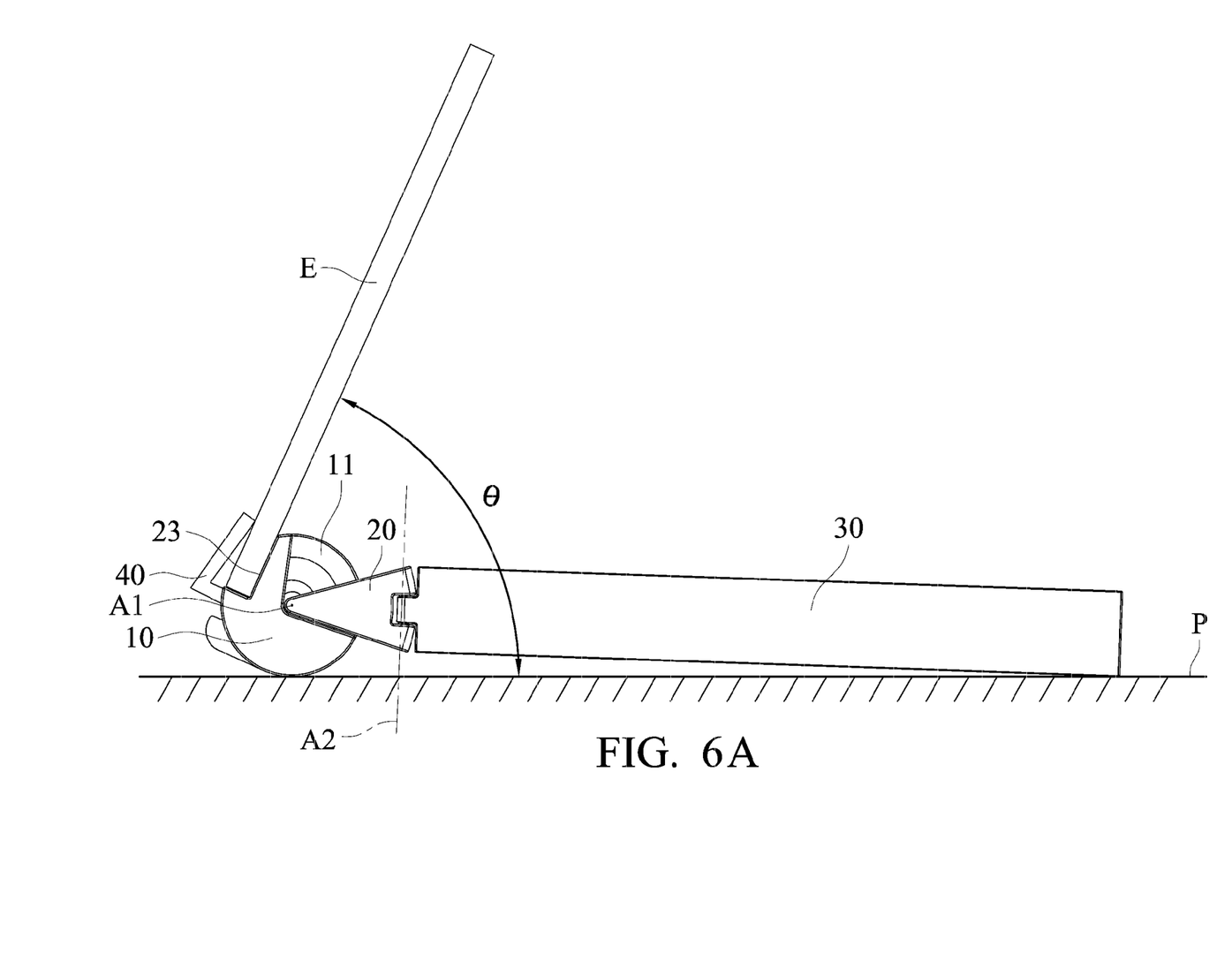
FIG. 6A is a side view of a supporting device in an unfolded state according to an embodiment of the invention.
Figure 6B:
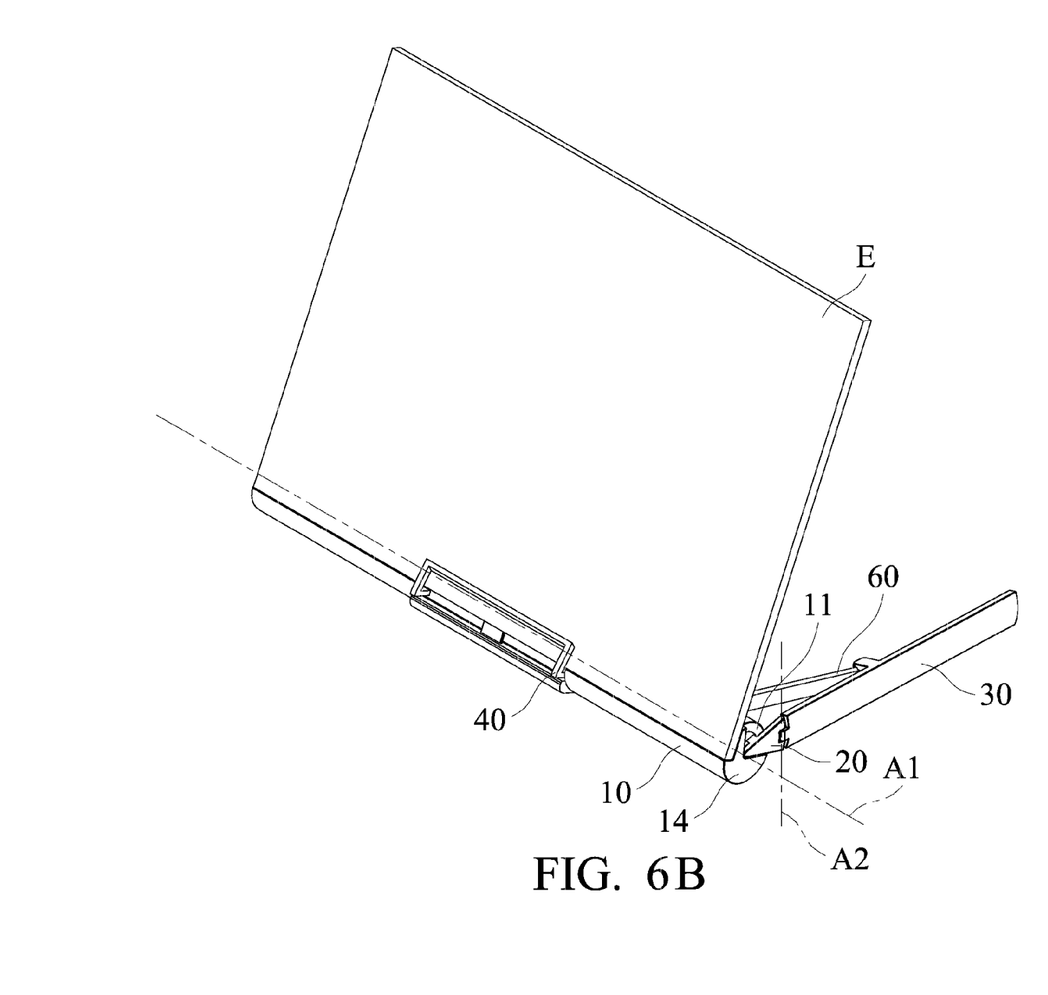
FIG. 6B is a schematic diagram of a supporting device in an unfolded state according to an embodiment of the invention.

Referring to FIGS. 6A and 6B, after the electronic device E is fixed in the third recess 23, the user can rotate the supporting member 30 relative to the connecting member 20 along the second axis A2 to an unfolded position, such that a predetermined angle θ is formed between the electronic device E and the flat surface P for convenient watching. In this embodiment, the predetermined angle θ between the electronic device E and the flat surface P is about 60°-85°. It should be understood that when the supporting member 30 rotates relative to the connecting member 20 along the second axis A2, the auxiliary arm 60 rotates relative to the supporting member 30 and slides along the auxiliary bar 50. Specifically, when the supporting member 30 is in the unfolded position, the auxiliary arm 60 pushes against the supporting member 30 and the auxiliary bar 50 to restrict the supporting member 30 in the unfolded position. When the electronic device E and the supporting device need to be stored, the user can reverse the aforementioned steps.

Though the electronic device E is inserted into the supporting device when the supporting member 30 rotates to the transitional angle relative to the connecting member 20 (FIGS. 5A and 5B), it can also be inserted into the supporting device when the supporting member 30 rotates to the predetermined angle θ relative to the connecting member 20 (FIG. 6). In some embodiments, the user can alter the angle between the electronic device E and the flat surface P by adjusting the angle between the supporting member 30 and the connecting member 20.

Figure 7A:
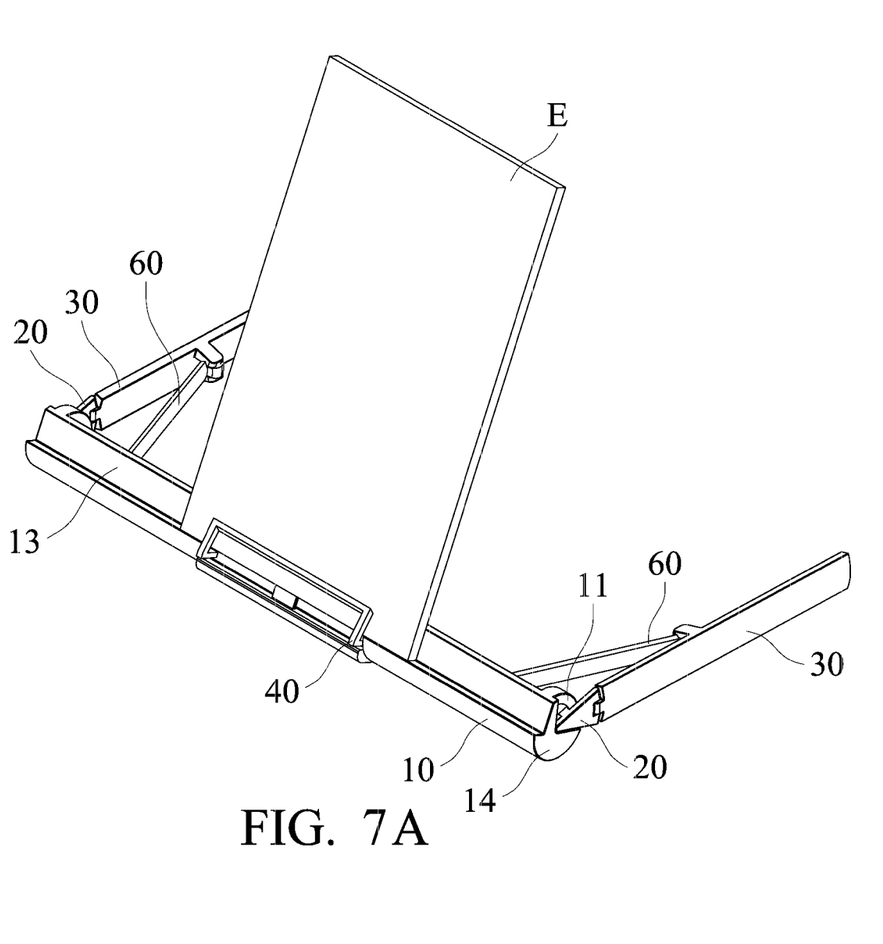
FIGS. 7A-7C are schematic diagrams representing three electronic devices of different dimensions inserted into a supporting device.
Figure 7B:
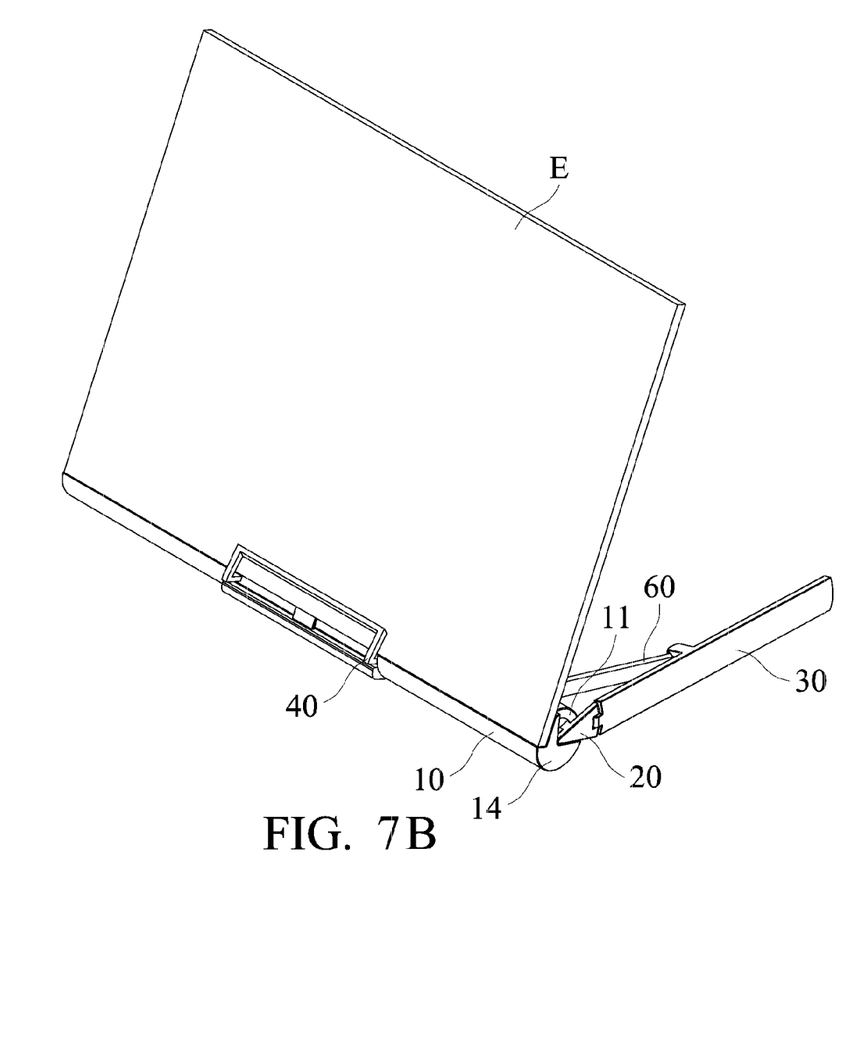
Figure 7C:
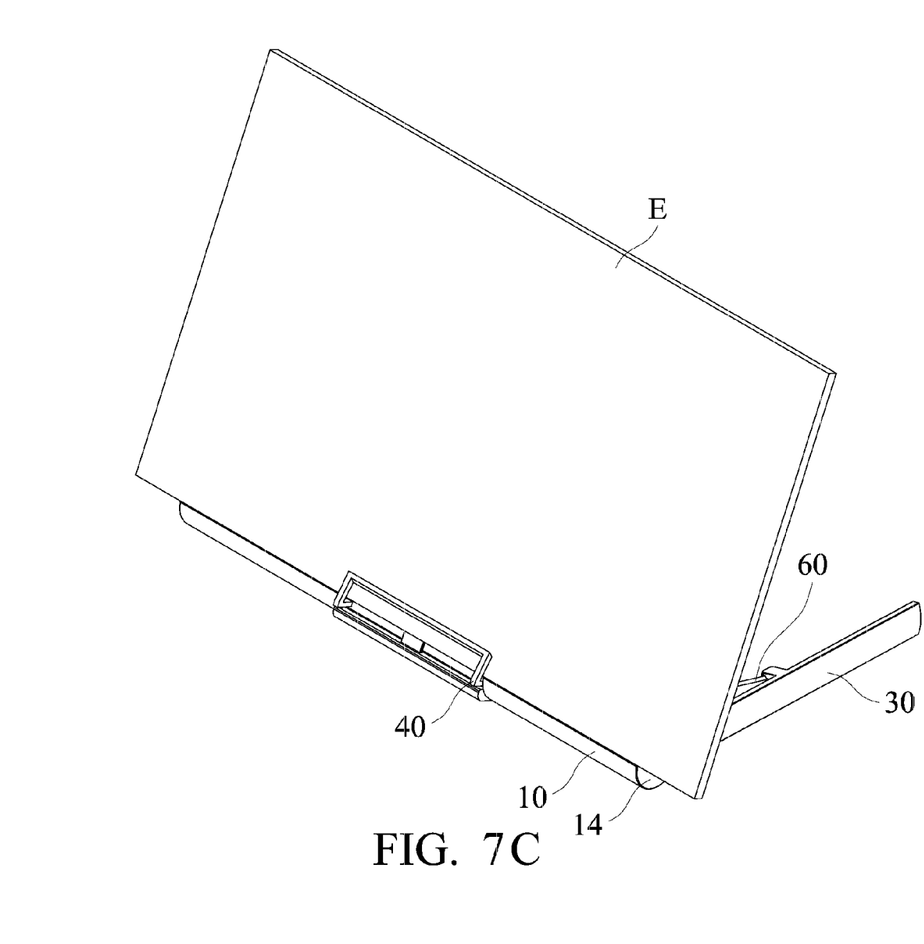

It should be further noted that the supporting device can adapt to electronic devices E of different dimensions and shapes. As shown in FIGS. 7A-7C, the electronic device E can be a smartphone with small dimensions (FIG. 7A) or a tablet computer with different dimensions (FIGS. 7B and 7C). The clamping member 40 may comprise rubber to prevent scraping damage of the electronic device E.

Figure 8:
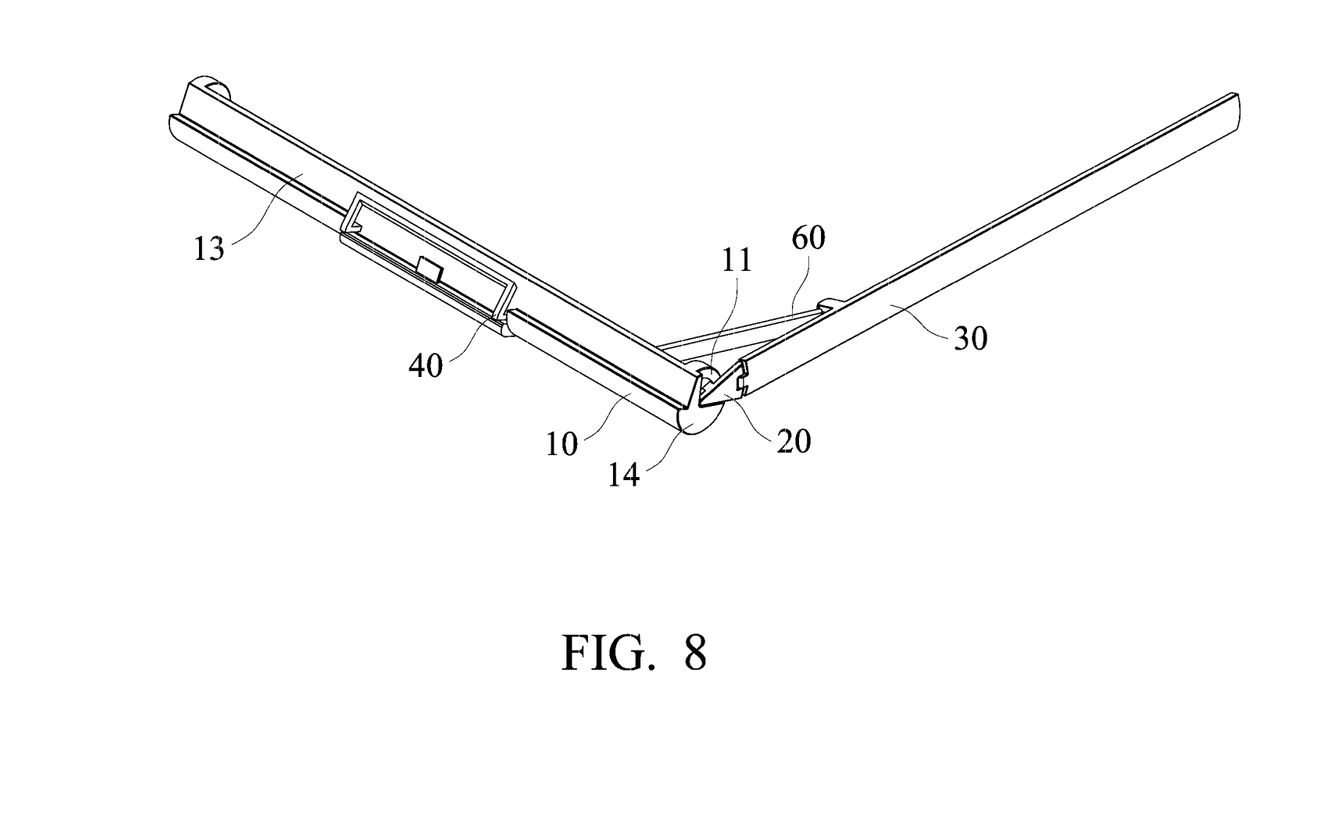
FIG. 8 is a schematic diagram of a supporting device according to another embodiment of the invention.

Referring to FIG. 8, another embodiment of the supporting device may comprise only one connecting member 20, only one supporting member 30, and only one auxiliary arm 60 disposed on the same side of the main body 10. Therefore, the dimensions and weight of the electronic device can be reduced for portability and easy storage.

In summary, a supporting device is provided in the invention. The user can simply rotate the supporting member when using the supporting device, such that the main body thereof rolls on a flat surface and rotates to the predetermined angle. The electronic device can be easily joined with the supporting device for comfortable watching. Furthermore, as the extending direction of the supporting member is parallel to that of the main body when in the folded state, the supporting device can be easily stored.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A supporting device for supporting an electronic device, the supporting device comprising:
    a longitudinal main body, having a first recess;
    a connecting member, pivotally connected to the main body and accommodated in the first recess, wherein the main body is rotatable relative to the connecting member along a first axis, and the main body is extended along the first axis;
    a longitudinal supporting member, pivotally connected to the connecting member and rotatable relative to the connecting member along a second axis, wherein the first axis is substantially perpendicular to the second axis;
    an auxiliary bar, disposed on the main body; and
    an auxiliary arm, pivotally connected to the supporting member and movably connected to the auxiliary bar.

2. The supporting device as claimed in claim 1, wherein the main body comprises a cylindrical structure.

3. The supporting device as claimed in claim 2, wherein the connecting member comprises a sector-shaped structure.

4. The supporting device as claimed in claim 3, wherein the sector-shaped structure forms an angle of 15°-45°.

5. The supporting device as claimed in claim 1, wherein the connecting member comprises a protrusion, and the main body has a curved groove, and the protrusion is movably joined to the groove.

6. The supporting device as claimed in claim 1, wherein the connecting member protrudes from the main body.

7. The supporting device as claimed in claim 1, wherein the main body comprises a side surface and the connecting member comprises a surface, both the side surface and the surface are perpendicular to the first axis, and the side surface is aligned with the surface.

8. The supporting device as claimed in claim 1, wherein the first recess has a sector-shaped structure.

9. The supporting device as claimed in claim 8, wherein the sector-shaped structure forms an angle of 80°-120°.

10. The supporting device as claimed in claim 1, wherein the supporting member forms a concave surface.

11. The supporting device as claimed in claim 1, wherein when the supporting device is in a folded state, an extending direction of the supporting member is parallel to that of the main body.

12. The supporting device as claimed in claim 1, wherein the main body has a second recess, and the auxiliary bar is disposed in the second recess.

13. The supporting device as claimed in claim 1, wherein the main body has a second recess, and the auxiliary arm is accommodated in the second recess when the supporting device is in a folded state.

14. The supporting device as claimed in claim 1, wherein the auxiliary arm comprises a rod and a slider, the slider is movably connected to the auxiliary bar, and the opposite sides of the rod are respectively pivotally connected to the slider and the supporting member.

15. The supporting device as claimed in claim 1, wherein the supporting device further comprises a clamping member connected to the main body for clamping the electronic device.

16. The supporting device as claimed in claim 15, wherein the main body has a third recess for accommodating the electronic device, and the clamping member is adjacent to the third recess.

17. The supporting device as claimed in claim 16, wherein the main body has a first recess, the first recess and the third recess are disposed on the opposite sides of the main body, and the connecting member is accommodated in the first recess.

18. The supporting device as claimed in claim 16, wherein the main body has a second recess, the second recess and the third recess are disposed on the opposite sides of the main body, and the auxiliary arm is accommodated in the second recess when the supporting device is in a folded state.

* * * * *